Oct. 16, 1951 W. M. EDWARDS 2,571,224
COTTON HARVESTER
Filed July 7, 1948 7 Sheets-Sheet 1

Fig. 1.

Walter M. Edwards
INVENTOR.

Fig. 3.

Oct. 16, 1951 W. M. EDWARDS 2,571,224
COTTON HARVESTER
Filed July 7, 1948 7 Sheets-Sheet 7

Walter M. Edwards
INVENTOR.

Patented Oct. 16, 1951

2,571,224

UNITED STATES PATENT OFFICE 2,571,224

COTTON HARVESTER

Walter M. Edwards, Seymour, Tex.

Application July 7, 1948, Serial No. 37,471

9 Claims. (Cl. 56—14)

This invention comprises novel and useful improvements in a cotton harvester and more specifically pertains to an apparatus for picking the cotton bolls from the growing plant in an improved manner.

It is a primary object of the invention to provide an apparatus for satisfactorily and efficiently harvesting cotton bolls from the growing crops.

A primary feature of the invention is to provide an apparatus having a plurality of picking units which can simultaneously harvest a plurality of rows of cotton during passage of the apparatus through a cotton field, the embodiment chosen to illustrate the principles of the invention comprising a pair of such units mounted on opposite sides of a tractor.

A further object is to provide a cotton harvester which will automatically adjust itself to accommodate different sizes of cotton plants for more efficient harvesting thereof.

A further feature of the invention resides in the provision of mechanism upon an apparatus of the character above set forth, whereby the device may be readily adapted and adjusted to accommodate various heights of growing cotton plants during the harvesting thereof.

A further object of the invention consists in providing a device which may be readily attached to, carried by and powered by conventional types of farm tractors for adapting the same for harvesting operation of cotton plants.

Still further features of the invention consist in the provision of improved mechanism for lifting the cotton bolls and plants whereby they may be more easily and effectively engaged and manipulated by the harvester during the passage of the machine through the cotton fields; in providing improved cotton stripping mechanism for removing the bolls from the cotton plants; in providing an improved highly efficient means for operating the cotton strippers; in providing efficient conveying means for removing the cotton stripped from the plants to conveyor chutes at the side of the machine and delivering the same to a common discharge duct at the rear end thereof; in providing improved means for separating leaves and dirt from the bolls of cotton removed from the stems or stalks by the machine; and in providing a satisfactory casing or enclosing mechanism for the various operating parts of the apparatus.

And a final feature of the invention to be specifically enumerated herein resides in the provision of a cotton harvester as set forth in the foregoing objects and features wherein each harvesting unit is longitudinally divided and hinged vertically at its back end for variably opening at the front end to straddle and receive a row of cotton plants.

These, together with various ancillary objects and features of the invention which will later become apparent as the following description proceeds, are attained by this device, a preferred embodiment of which has been illustrated by way of example only in the accompanying drawings, wherein:

Figure 7 is a vertical transverse sectional detailed view taken substantially upon the plane of the section line 7—7 of Figure 4;

Figure 8 is a further vertical sectional detailed view taken substantially upon the plane of the section line 8—8 of Figure 4;

Figure 9 is a horizontal sectional detailed view taken substantially upon the plane of the section line 9—9 of Figure 4;

Figure 10 is a perspective view of one of the cotton raker shafts of the picker; and, Figure 11 is a perspective view of one of the cotton picker rolls of the device.

Referring now more specifically to the accompanying drawings, wherein like numerals designate similar parts throughout the various views, wherein the numeral 10 designates generally a portion of a tractor of any suitable type, and which is provided with the customary rear axle and differential housing frame indicated at 12.

Figure 1:
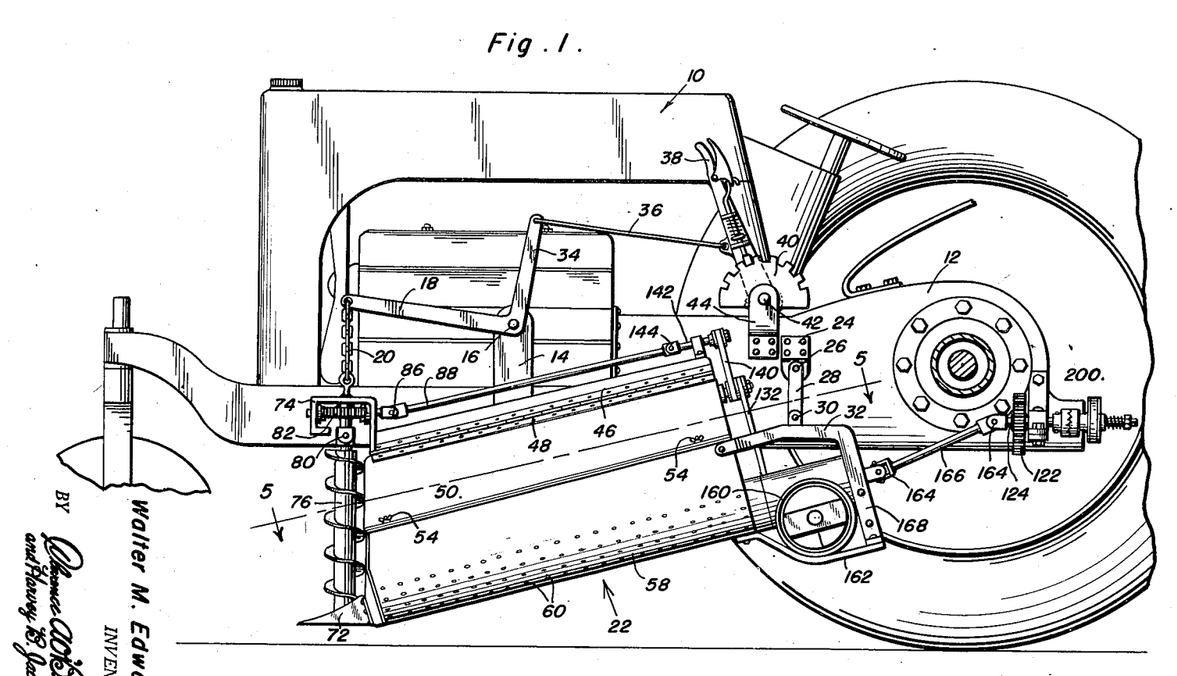
Figure 1 is a fragmentary side elevational view showing the preferred embodiment of the invention applied as an attachment to a conventional type of farm tractor.
Figure 2:
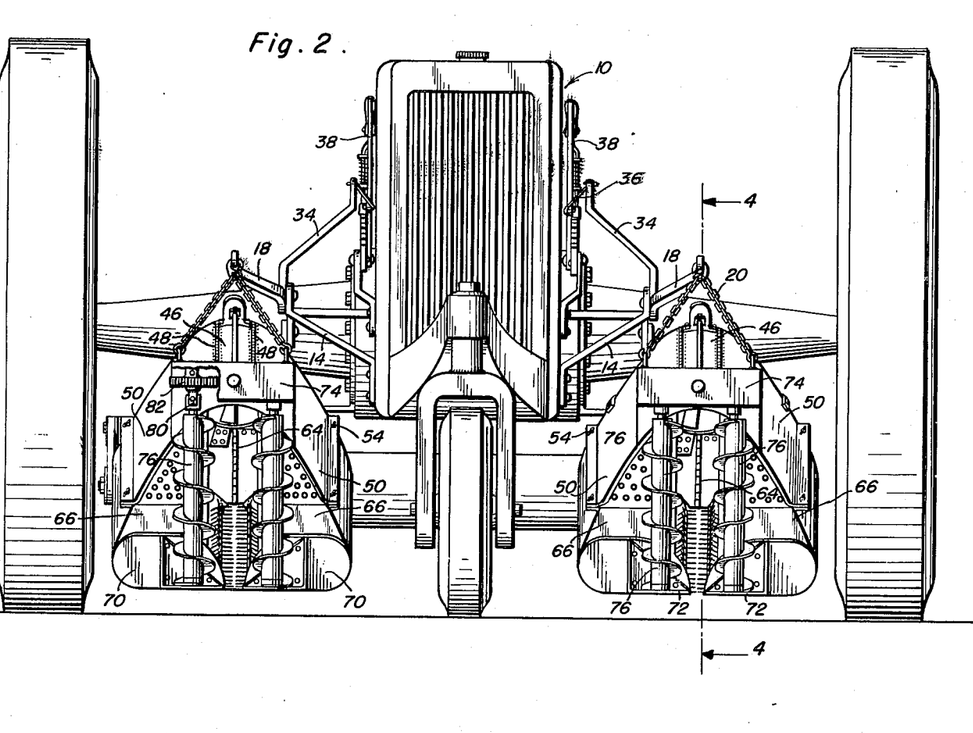
Figure 2 is a front elevational view of the tractor showing two elements of the invention applied to and carried by opposite sides of the tractor.
Figure 4:
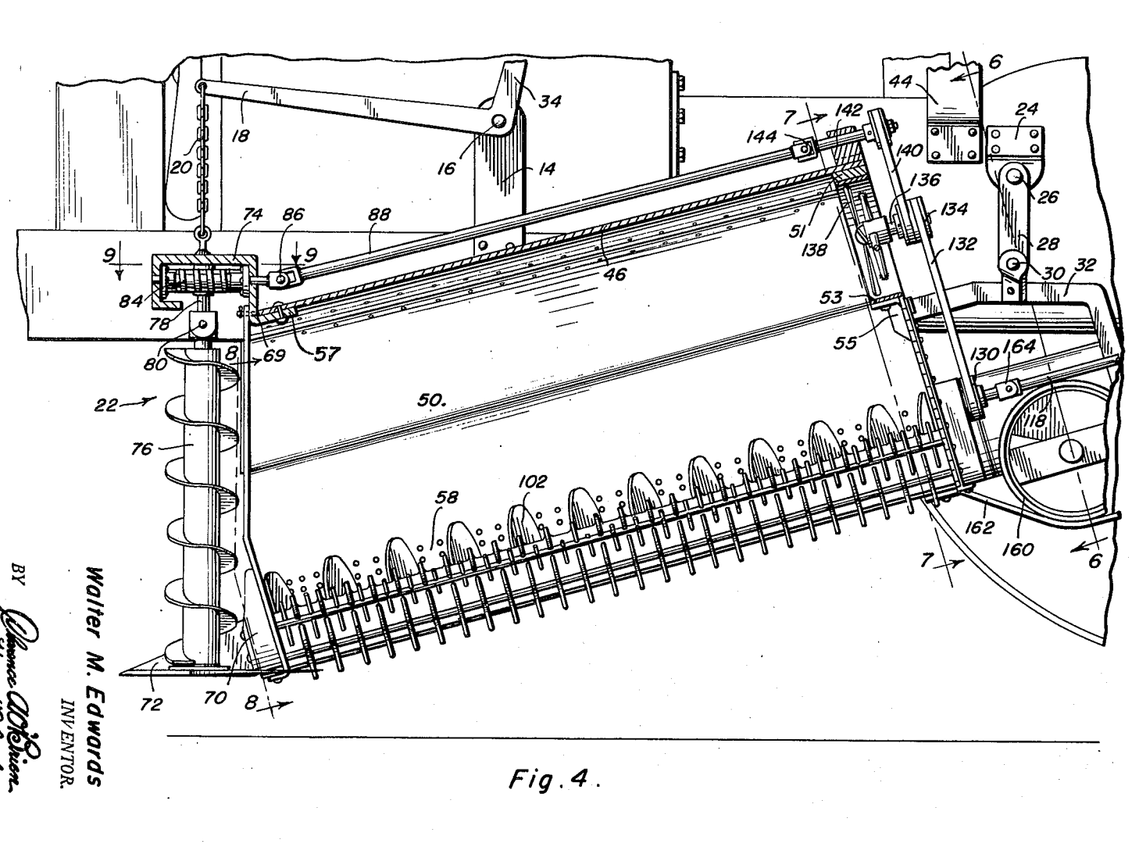
Figure 4 is an enlarged vertical central longitudinal sectional view taken substantially on the plane of section line 4—4 of Figure 2 through one of the picker units showing the mounting of the same upon a tractor, and certain of the constructional features thereof.
Figure 6:
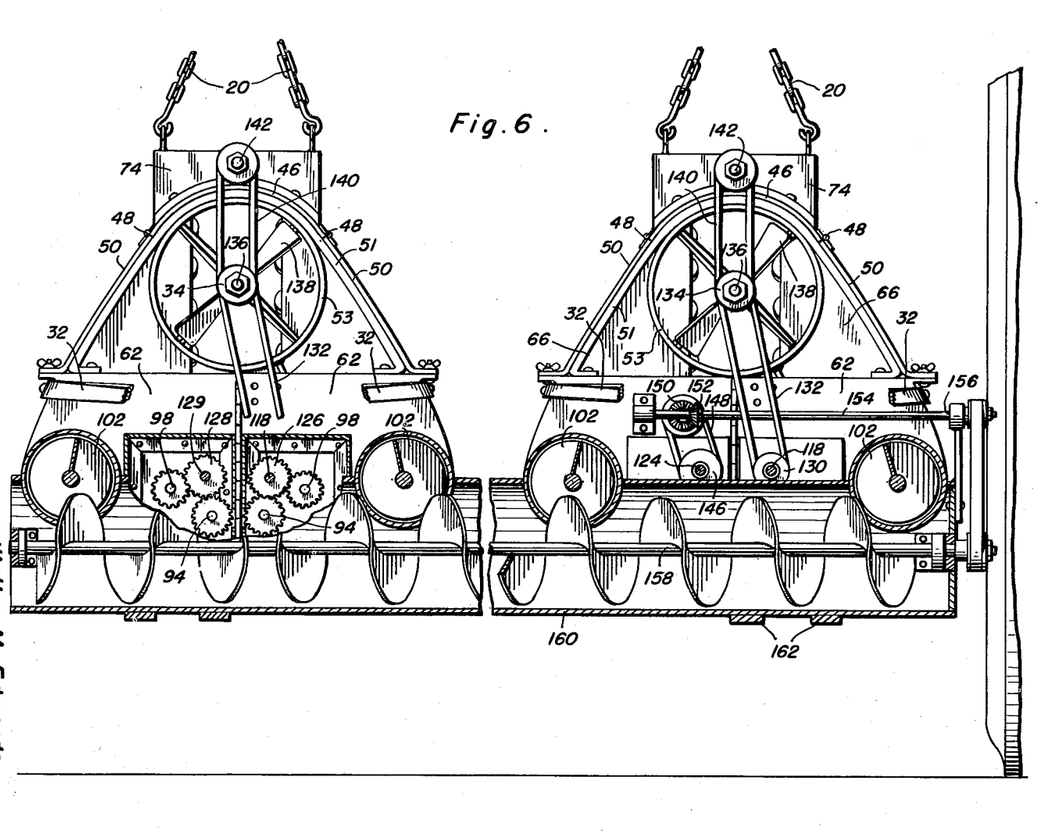
Figure 6 is a vertical transverse sectional detailed view taken substantially upon the plane of the section line 6—6 of Figure 4 and showing the discharge conveyor at the rear end of the pickers and certain other mechanism of the device.

As shown best in Figures 1, 2 and 4, brackets 14 are secured to the side frame of the tractor, adjacent the front end thereof and on opposite sides of the frame, each of these brackets being provided with a fulcrum pin 16 upon which is journalled a bellcrank whose forward arm 18 is secured to the upper ends of a pair of supporting chains or cables 20, see Figures 2 and 6, by means of which the front end of a picker unit, one mounted on each side of the tractor, is adjustably supported as set forth hereinafter.

Suitably attached to the opposite sides of the axle and differential frame portion 12 of the tractor, are supporting brackets 24, see Figure 4, secured to opposite sides thereof in any suitable manner, and to which are pivoted and from which depend links 26 connected as at 26, the lower extremities of these links being pivotally connected as at 30 to one of a pair of supporting frame members 32, see Figures 1, 3-6, secured to the opposite sides of the rear ends of each of the picker units 22 and to be more fully described hereinafter.

The other end of the bellcrank arm 34, is pivotally connected at its outer extremity to a connecting link or cable 36 which is secured to a control lever 38, cooperating with a ratchet plate 40, which lever is pivoted as at 42 to a supporting bracket 44 attached rigidly in any suitable manner to the frame member 12 of the tractor and to the ratchet plate 40. Thus, each of the picker units or casings 22 is adjustably supported from its front and rear ends by means of the chains 20 and the links 28. Obviously, as the lever 38 is manipulated, the bellcrank is rotated and the chains 20 serve to raise or lower the forward end of the picker units 22, which units rotate about the support pins 30 and/or 26 as fulcrum pins. This permits raising or lowering of the front end of the picker in order to enable the device to adjust itself or accommodate various types of cotton plants which it is desired to harvest.

The picker attachments are of generally triangular shape in vertical transverse cross-section, as indicated best in Figures 2, 6-8. Since the picker units 22 are of identical construction except that one is left-hand and one is right-hand, depending on which side of the tractor the individual unit is to be mounted, description of one will suffice for all. Each unit comprises a top casing member or wall 46 extending longitudinally the length thereof, and to the sides of which is hinged as at 48, a casing cover member or side wall 50 at each side of each unit. The lower end of this cover is provided with a flange 52 and any suitable fastening means indicated generally at 54 by means of which the lower end of each cover is detachably connected to a corresponding flange 56 upon the outer marginal edge of a semi-cylindrical bottom casing member or trough 58 provided with a plurality of apertures 60. As will be readily seen by reference to each of Figures 3, 5, 6 and 7, a pair of these bottom channel members 58 are provided at the lower outer edges of each of the picker units. As shown best in Figures 4-8, the top frame member 46 at its rear end extends rearwardly of the cover or closure panels 50, and rests upon a flexible metallic strap 51 whose central portion overlies and is secured upon a fan casing 53 carried by an angular supporting bracket 55 secured to the upper part of rear panels or end walls 62, which are vertically hinged to each other as at 64, thereby permitting relative hinging movement of the housing of the picker about the central vertical axis of the hinges 64 as set forth hereinafter. The strap at its ends rests on the flanges 56 and thus supports the rear ends of covers 50 and top member 46. At its front end, the member 46 is similarly mounted upon and supported by a portion of a channel member 74 or a strap 57, see Figures 4 and 8, and is provided with inwardly extending end walls 66, see Figures 2, 5 and 8, which terminate in spaced relation to each other as at 68 to provide a throat for permitting the passage of cotton plants therebetween during operation of the device as set forth hereinafter. The width of this throat is adapted to be varied by hinging the two halves of the picker casing upon the rear vertical end 64 as set forth hereinafter. The end walls 66 are hinged as at 69 to a channel member 74 to permit the cover panels 50 and end walls 66 to swing relative to each other.

Figure 5:
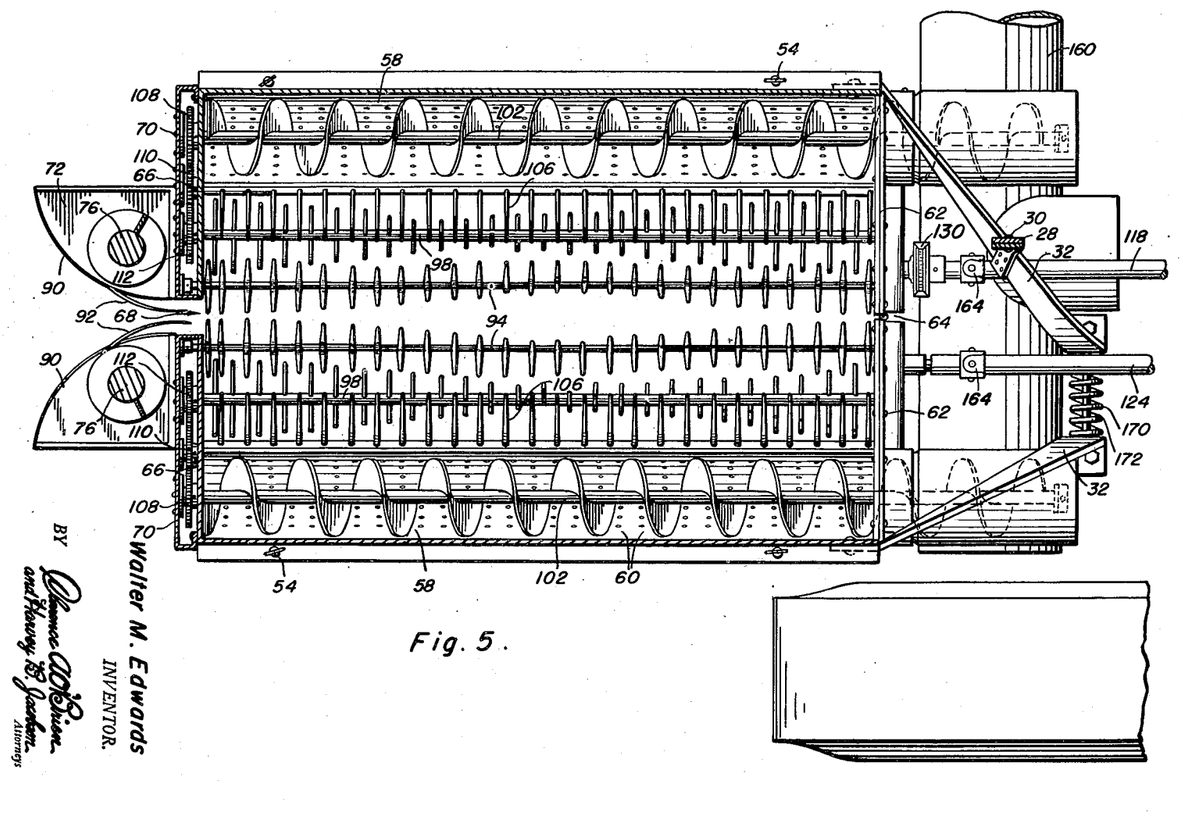
Figure 5 is a horizontal sectional detailed view through the picker taken substantially upon the plane of the broken section line 5—5 of Figure 1.

Removable closure members, as shown best in Figure 5, are secured to the front walls 66 for forming therebetween a gearing compartment for housing the operating gearing of parts of the mechanism to be later described. Each of the casings 70 has at its lower end a forwardly extending supporting plate 72, of quadrant shape in cross-section, these plates having their outer edges upwardly extending to form guiding surfaces as indicated in Figure 1. A U-shaped channel member 74 is mounted transversely of the picker unit 22 at the front and upon the top of the longitudinal member 46 thereof, and the above aforementioned supporting chains 20 are secured to this channel member as shown clearly in Figure 6.

A pair of vertically disposed spiral screws 76 are journalled between the above mentioned supporting plates 72) and the channel members 74 in substantially parallel spaced relation to each other and on opposite sides of the throat 68. The lower end of these screws are journalled in any suitable manner on the supporting plates 72, while the upper ends thereof as shown in Figure 4, are detachably connected to stub shafts 78 as by a universal joint coupling 80. These stub shafts are provided with spur gears 82 secured thereto within the confines of the channel members 74, and are suitably journalled in any suitable manner in the channel members. A common worm type of driving gear 84 is journalled in the side walls of the channel members 74, and extending rearwardly thereof is connected as by a universal joint coupling 86 with a driving shaft 88. The worm gear 84 is constantly in mesh with the spur gears 82 and drives the same in opposite directions as indicated by the arrows in Figure 9. Preferably, the arrangement is such that upon rotation of the driving shaft 88, the spiral screws 76 are caused to rotate in a direction to engage the cotton plants passing therebetween on opposite sides thereof and to lift or draw the plants into their erect position, and to assist in stripping the cotton bolls from the plants.

The curved inwardly converging ends or edges 90 of the above mentioned plates 72 (see Figure 5) assist in directing the plants between the spiral threaded members and into the throat 68 and are assisted in this purpose by spring guide members 92 converging rearwardly towards each other as shown in Figure 5.

Figures 7, 8, 9, 10, 11:
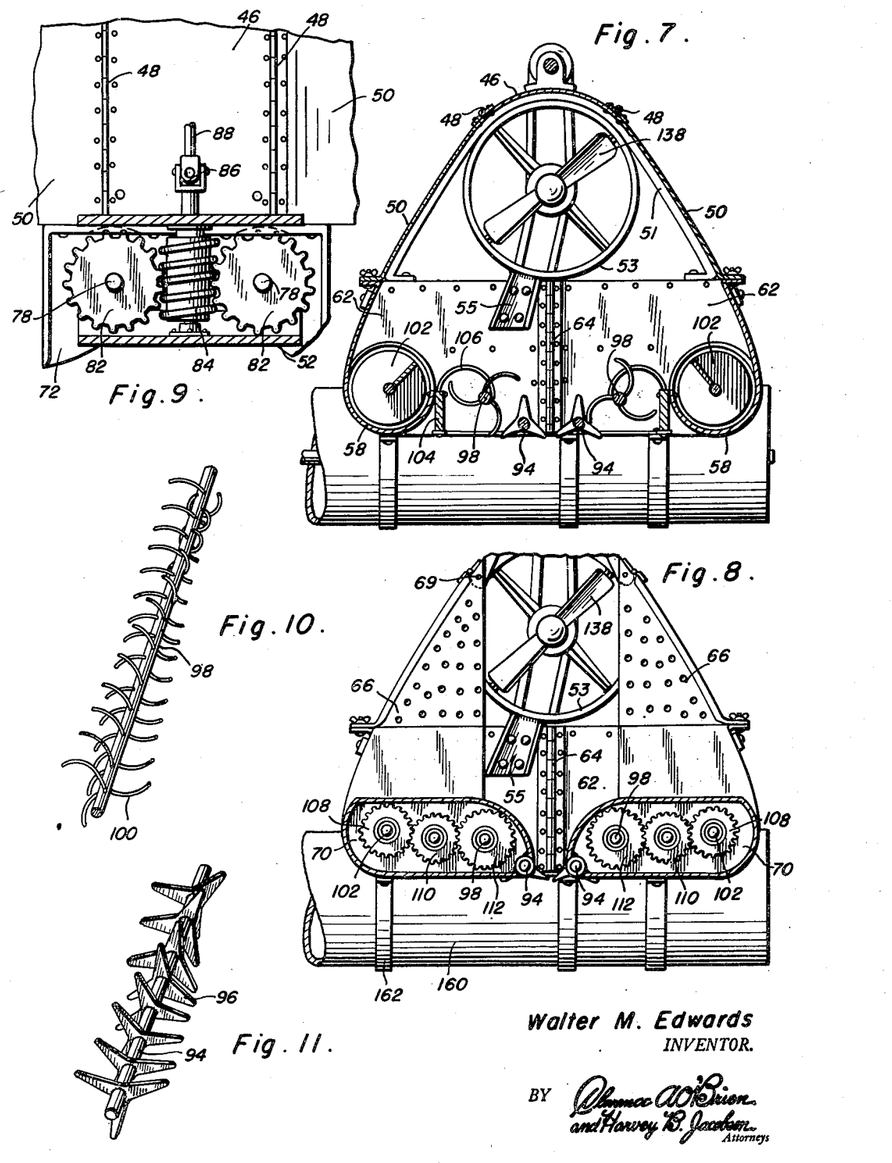

Immediately adjacent the opposite sides of the throat 68 above mentioned, are parallel longitudinally extending picker shafts 94 which are journalled between the front and rear end walls 66 and 62 respectively. These shafts, as shown in Figures 5, 7 and 11, are provided with a plurality of picking blades having radially extending substantially triangular and flat arms 96 constituting picker teeth, which teeth are preferably arranged in longitudinally spaced radial groups upon the shaft 94. Further, the teeth are of equal and similar lengths through the length of the shafts, to provide an equal clearance therebetween, as shown in Figure 5, whereby the teeth will be effective to strip the cotton bolls from the plants passing therebetween in view of the upward travel of the adjacent teeth on adjacent shafts.

A pair of rake rolls 98 indicated in Figures 5 and 10, are journalled in the front and rear end members 66 and 62, in parallel relation to and upon the opposite sides of the shafts 94. These raker rolls are provided with sets of curved teeth 100 of equal lengths which are similarly disposed to the teeth 96 but are staggered longitudinally with respect thereto in order to pass therebetween as shown in Figure 5. The raker rolls rotate in opposite directions to the picker rolls, whereby as will be seen by particular reference to Figures 5 and 7, the cotton removed by the stripping rolls are lifted and passed laterally by the raker rolls and delivered to the conveyor screws 102, one of which is disposed at each side of the picking unit, journalled in the front and rear walls 66 and 62 thereof, and positioned in the semi-cylindrical trough or pan 58 previously mentioned.

As will be noted by particular reference to Figure 7, longitudinally extending members 104 are positioned between the raker rolls 98 and the screw conveyor 102, and are provided with a plurality of resilient arcuate fingers 106 secured thereto and having their opposite extremities bent upwardly and over the raker rolls 98 and engaging the opposite side thereof. These fingers 106 serve to assist in removing the cotton bolls from the raker rolls and guiding the same across into the conveyor 102 and its trough or channel 58.

As so far described, it will thus be seen that as the machine travels along a cultivated row of cotton, the cotton stalks are fed to the throat of the machine, the stalks are straightened and the bolls are then stripped therefrom by the combined action of the vertical spiral screws 76 and the oppositely rotating picker rolls 94. The bolls of cotton thus stripped are removed from the picker rolls by the raker rolls and are again removed therefrom by the spring fingers 106 and discharged laterally into the conveyor trough 58. During this movement, the cotton is considerably agitated, and leaves, straw or dirt connected therewith will be separated therefrom by the agitation and handling of the cotton. From the conveyor rolls, the cotton is passed rearwardly of the device through the trough 58 and discharged at the rear end thereof in a manner to be set forth subsequently. As will be seen by reference to Figure 8, the conveyor shafts 102 at their forward ends are provided with spur driving gears 108 which are constantly in mesh with idler gears 110 suitably journalled on the front end plate 66 within the closure 70 above set forth, which idler gears are also in continuous engagement with spur driving gears 112 carried by the forward ends of the raker shafts 98. It will thus be seen that upon rotation of the raker shafts from the rear end of the unit in a manner to be subsequently set forth, the conveyor shafts by means of the idlers are rotated in the same direction from the front end of the machine.

Figure 3:
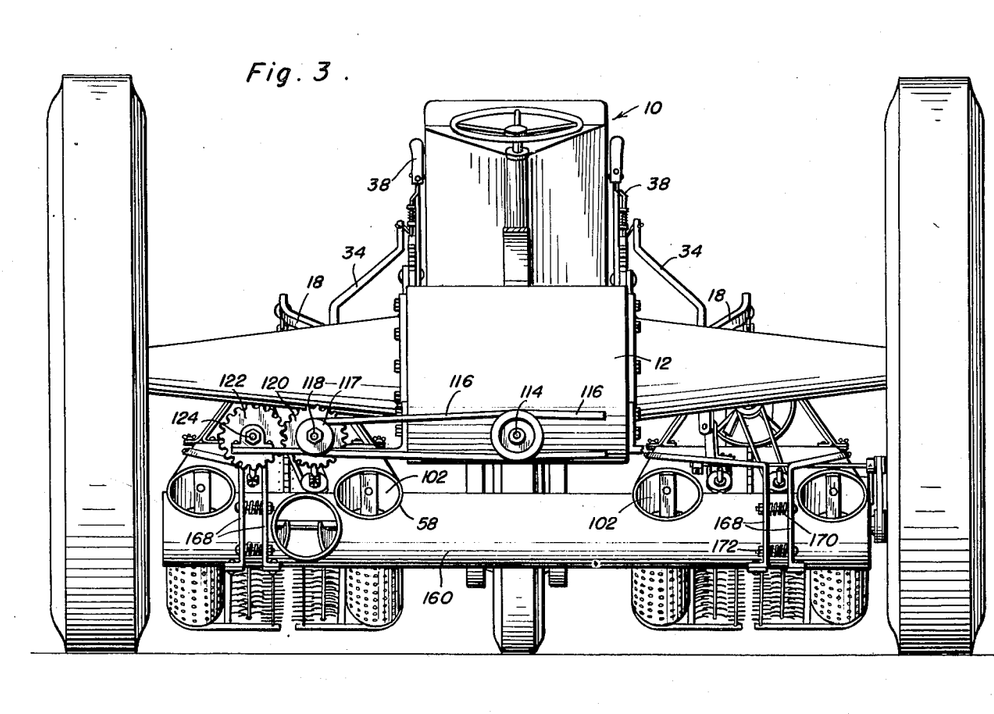
Figure 3 is a rear elevational view of the tractor having the elements or pickers of this invention mounted thereon, parts being broken away.

Each of the picker units is powered from a power take-off shaft 114, see Figure 3, at the rear end of the tractor, by means of belt drives 116 or other suitable power transmitting means, which connect the power shaft 114 to the driven shafts 118 of each unit through the pulleys 117. The shaft 118 has a gear 120 thereon which is constantly in mesh with a similar gear 122 carried on a parallel shaft 124, whereby the power transmitted to the shaft 118 is effective to rotate the parallel shaft 124 in an opposite direction at an equal rate of speed. This construction is duplicated upon each of the picker units, shown in Figure 3.

The shafts 118 and 124 respectively have articulated extensions referred to hereinafter more specifically, which extend into the gear casings at the rear ends of each of the picker units, see Figure 6, and therein are provided with gears 126 and 128 respectively, each of which gears is in mesh with gears upon the extremities of the shafts 98 and 94, for simultaneously driving the same and their associated previously described mechanism.

Externally of the rear gear casing, the extensions of the shafts 118 are provided with pulleys 130, see Figure 4, which are connected as by means of belts 132 with similar pulleys 134 carried by axles 136 suitably mounted in the rear wall of the casing of the picker. The axles 136 are journalled in the fan casing 53 supported upon the upper portion of the picker casing plates 62 and are provided with fans or blowers 138 which draw air through the upper portion of the casing, this air serving to separate dirt, leaves or the like from the cotton being handled by the rakes and pickers, and discharging this dirt and cleansing the cotton, in a manner which may be readily apparent. A further belt connection 140 drivingly connects the shafts 136, with a stub shaft 142 journalled on the upper surface of each picker unit, this shaft 142 being connected as by a universal joint 144 in driving relation to the shaft 88 above mentioned. As shown best in Figure 6, the extension of the driving shaft 124 of the right-hand picker unit is connected as by a pulley 146 and a belt drive 148, with a bevel gear 150 suitably journalled upon the casing of the picker unit. This bevel gear 150 is constantly in mesh with a gear 152 upon a lay shaft 154 journalled upon and extending transversely of the rear wall of the picker unit, which lay shaft at its outer extremity is connected as by a belt drive 156 with a transversely extending spiral screw 158 rotatably journalled in a laterally disposed discharge conduit or casing 160, which casing is intersected by the above mentioned spiral screw conveyors 102. Thus, cotton collected by each of the picker units is discharged into the laterally extending spiral screw conveyor 158 and discharged from the end thereof, to any suitable container for collection as desired.

This discharge screw conveyor 160 as shown in Figures 1 and 6 is suitably connected to the rear end of the picker units as by fastening straps 162, in a readily apparent manner.

As more clearly appears in Figure 1, the driving shafts 118 and 124 connected with their extensions, above mentioned, by suitable universal joints 164 and connecting shaft sections 166 intermediate the power take-off and the picker unit, whereby the vertical adjusting and oscillating movement of the picker may be accommodated without interfering with the transmission of power from the tractor power take-off to the associated parts of the picker units.

As shown more clearly in Figures 1, 3 and 5, the pairs of rear supporting brackets 32 of the picker units are provided with downwardly extending substantially parallel straps 168 between which are secured coil compression springs 170 adjustably tensioned and the parallel straps 168 are thereby adjustably tensioned with respect to each other by means of bolts or similar fastening means 172 extending therethrough and through the coil springs 170.

Since as shown in Figure 5, the upper extremities of the brackets 32 are rigidly secured to the sides of the hinged portions of the casings of the picker units, the two hinge sections of each unit at their front ends, at the throat 68, are resiliently urged towards each other. However, as will be readily understood, the picker sections will be forced apart as a row of plants passes between the guides 92 and into the inlet throat or opening 68 of the picker units, whereby the device will readily and resiliently accommodate itself to the width of a row of plants being harvested.

The springs 170 thus serve to cause the two hinge sections of each unit to resiliently clamp upon and engage a row of cotton plants to bring the operating parts of the mechanism into most efficient relation and juxtaposition to the plants.

From the foregoing, it is thought that the manner of constructing and operating the device will be readily understood. As the tractor carrying the pair of picker units on opposite sides thereof moves between two rows of plants, each of the units embraces a row of plants as the device travels therealong. The power take-off of the tractor is operated by the clutch means 200, see Figure 1, whereby each or both of the units are operated as desired. The forward rolls of the picker units thus lift and urge the plants into an upright position, and assist the stripping rolls in removing cotton therefrom. The raker rolls then carry this cotton to the rearwardly travelling screw conveyors, and the cotton bolls collected by four of these conveyors are delivered to the transversely disposed screw-type discharge conveyors. At the same time, the fan means 138 causes a blast of air through the device which assists in separating dirt and trash from the bolls of cotton. The hinge sections of each unit obviously resiliently accommodate themselves to the thickness of the rows of cotton being harvested, without interrupting the gearing of the parts.

At the same time, the front and rear ends of the picker units may be individually raised or lowered, without in any way interrupting or interfering with the operation of their moving parts. Thus, the device is readily adaptable to accommodate varying heights of plants within a row, as well as rows planted upon uneven ground.

As previously mentioned, a plurality of units or pickers may be supported by a single tractor. For this purpose transverse supporting beams would be mounted upon the tractor with the front and rear supports of each unit mounted thereon, to apply the principles of the invention to an apparatus for simultaneous harvesting of a plurality of rows of cotton.

It is thought evident that numerous modifications and substitutions of parts will readily occur to those skilled in the art after a consideration of the foregoing specification and annexed drawings. Accordingly, it is not intended to limit the principles of the invention to the exact constructions of the embodiments illustrated and described, since the disclosure herein is to be regarded as illustrative of the principles of the invention only. Accordingly, various modifications and equivalents may be resorted to, falling within the scope of the appended claims.

Having described the invention, what is claimed as new is:

1. In a cotton harvester, an elongated casing having spaced side walls vertically hinged at their rear ends and forming a longitudinal slot on their lower surfaces, said side walls being laterally spaced at their front ends to define a throat opening into said slot, longitudinal conveyors on the inner sides of each side wall for conveying cotton bolls rearwardly thereof, a transverse conveyor at the rear of said casing and mounted to receive cotton from said longitudinal conveyors, means for mounting said casing from a tractor, means for operating all of said conveyors from the power take-off of a tractor, means associated with said side walls yieldingly urging the forward ends of said side walls together, and vertical stripping screws carried by said sections, said screws being on opposite sides of said slot and located at said throat, and means for actuating said vertical screws from said operating means.

2. The combination of claim 1 wherein said actuating means includes a shaft mounted on said casing, said shaft being connected to each of said vertical screws at its forward end and to said operating means at its rear end.

3. In a cotton harvester, an elongated casing having spaced side walls vertically hinged at their rear ends and forming a longitudinal slot on their lower surfaces, said side walls being laterally spaced at their front ends to define a throat opening into said slot, longitudinal conveyors on the inner sides of each side wall for conveying cotton bolls rearwardly thereof, a transverse conveyor at the rear of said casing and mounted to receive cotton from said longitudinal conveyors, means for mounting said casing from a tractor, means for operating all of said conveyors from the power take-off of a tractor, means associated with said side walls yieldingly urging the forward ends of said side walls together, and vertical stripping screws carried by said sections, said screws being on opposite sides of said slot and located at said throat, means for actuating said vertical screws from said operating means, and a gear housing secured to the front end of said casing, the upper ends of said stripping screws being extended into said housing and having a gear thereon, said actuating means including a shaft extending into said housing, and a driving gear on said shaft engaging each of said stripping screw gears.

4. In a cotton harvester, a picker unit including an upper wall, a pair of side walls secured to said upper wall for movement toward and away from each other, said side walls having forward and rear ends, a hinge joining the rear ends of said side walls and permitting relative spreading of the forward ends of said side walls, longitudinal conveyors in the unit for conveying cotton bolls from the forward ends of the side walls to the rear ends thereof, means mounted in said unit for raking cotton bolls passing through said unit, means mounted in said unit for picking cotton bolls passing through said unit from said first-mentioned means, a transverse conveyor at the rear of said unit for receiving cotton from said longitudinal conveyors, means disposed exteriorly of said unit and at the front end of said unit for stripping cotton bolls from plants prior to the entrance of plants into the unit, and means connecting the side walls and yieldingly urging the forward ends of said side walls together to resiliently clamp plants therebetween.

5. In a cotton harvester, a casing including an upper wall, a pair of side walls secured to said upper wall for movement toward and away from each other, said side walls having forward and rear ends, hinge means joining the rear ends of said side walls and permitting movement of the forward ends of said side walls toward and away from each other, means mounted within said casing for moving cotton bolls from the forward end of said casing toward the rear end thereof, means forming a connection between the rear ends of said side walls and yieldingly urging the forward ends of said side walls together for clamping a row of cotton plants therebetween, and means mounted on and disposed exteriorly of said casing adjacent the front ends of said side walls for engaging and lifting plants prior to their entrance into the casing and for also stripping cotton bolls from the plants.

6. The combination of claim 5 wherein said means mounted on and disposed exteriorly of said casing adjacent the front ends of said side walls includes a pair of substantially vertically disposed, spaced, spiral screws.

7. In a cotton harvester, a casing including an upper wall, a pair of side walls secured to said upper wall for movement toward and away from each other, said side walls having forward and rear ends, hinge means joining the rear ends of said side walls and permitting movement of the forward ends of said side walls toward and away from each other, means mounted within said casing for moving cotton bolls from the forward end of said casing toward the rear end thereof, and means forming a connection between the rear ends of said side walls and yieldingly urging the forward ends of said side walls together for clamping a row of cotton plants therebetween, said last-named means including a pair of rearwardly extending brackets carried by said side walls at the rear ends thereof, a rod between said brackets, and a spring embracing said rod and biased between said brackets.

8. In a cotton harvester, an elongated casing having spaced side walls vertically hinged at their rear ends and forming a longitudinal slot on their lower surfaces, said side walls being laterally spaced at their front ends to define a throat opening into said slot, longitudinal conveyors on the inner sides of each side wall for conveying cotton bolls rearwardly thereof, a transverse conveyor at the rear of said casing and mounted to receive cotton from said longitudinal conveyors, means for mounting said casing from a tractor, means for operating all of said conveyors from the power take-off of a tractor, and means associated with said side walls yieldingly urging the forward ends of said side walls together, said last named means including rearwardly extending brackets rigidly secured to said side walls, and spring means biased between said brackets.

9. The combination of claim 8 including guide means mounted in said throat for directing a row of cotton plants into said throat and slot.

WALTER M. EDWARDS.

REFERENCES CITED

The following references are of record in the file of this patent:

UNITED STATES PATENTS

| Number | Name | Date |
| --- | --- | --- |
| 183,433 | Stoddard et al. | Oct. 17, 1876 |
| 291,643 | Terman | Jan. 8, 1884 |
| 590,090 | Deaderick | Sept. 14, 1897 |
| 856,178 | Neil | June 4, 1907 |
| 1,007,504 | Tanner | Oct. 31, 1911 |
| 1,722,747 | Hentz | July 30, 1929 |
| 1,778,587 | Crumley | Oct. 14, 1930 |
| 2,355,880 | Macha | Aug. 15, 1944 |
| 2,406,058 | Boone | Aug. 20, 1946 |
| 2,451,130 | Townsend | Oct. 12, 1948 |